(12) United States Patent  
Iida

(10) Patent No.: US 7,566,232 B2  
(45) Date of Patent: Jul. 28, 2009

(54) BIDIRECTIONAL DC/AC INVERTER

(75) Inventor: Takahide Iida, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 496 days.

(21) Appl. No.: 11/581,093

(22) Filed: Oct. 13, 2006

(65) Prior Publication Data

US 2007/0085422 A1   Apr. 19, 2007

(30) Foreign Application Priority Data

Oct. 17, 2005   (JP)   ............................... 2005-301400

(51) Int. Cl.  
*H01R 13/44*   (2006.01)

(52) U.S. Cl. ........................................ 439/145; 363/37

(58) Field of Classification Search ................. 439/145, 439/135, 136, 146, 936, 276; 363/37  
See application file for complete search history.

(56) References Cited

U.S. PATENT DOCUMENTS

| | | | | |
|---|---|---|---|---|
| 5,243,510 A | * | 9/1993 | Cheney, II | ................... 363/146 |
| 5,777,868 A | * | 7/1998 | Gibboney, Jr. | ............... 363/146 |
| 6,644,984 B2 | * | 11/2003 | Vista et al. | .................. 439/76.1 |
| 7,101,226 B1 | * | 9/2006 | Gilliland | ................. 439/620.01 |
| 2006/0279968 A1 | * | 12/2006 | Iida | .......................... 363/21.01 |
| 2007/0086216 A1 | * | 4/2007 | Iida | .............................. 363/16 |
| 2007/0086222 A1 | * | 4/2007 | Iida | .............................. 363/37 |

FOREIGN PATENT DOCUMENTS

| | | |
|---|---|---|
| JP | 2000-224780 | 8/2000 |
| JP | 2001-37226 | 2/2001 |
| JP | 2002-10517 | 1/2002 |

* cited by examiner

*Primary Examiner*—Tulsidas C Patel  
*Assistant Examiner*—Harshad C Patel  
(74) *Attorney, Agent, or Firm*—Locke Lord Bissell & Liddell LLP

(57) ABSTRACT

A bidirectional DC/AC inverter includes a power conversion means in connection with an electric storage means, a control means operable to control an operation of the power conversion means, a plug for electrically connecting a power source to the power conversion means, an outlet for electrically connecting a load to the power conversion means, an inhibiting member operable to cover at least the plug to inhibit the power conversion means from being electrically connected to the power source, and a detecting means operable to detect whether the plug is covered or not. The control means inhibits the power conversion means from outputting alternating-current power when the detecting means detects that the plug is not covered by the inhibiting means.

18 Claims, 3 Drawing Sheets

BIDIRECTIONAL DC/AC INVERTER

BACKGROUND OF THE INVENTION

The present invention relates to a bidirectional DC/AC inverter, and more particularly to control for a bidirectional DC/AC inverter to switch between an operation of charging a battery and an operation of outputting alternating-current power.

FIG. 3 is a view of an existing bidirectional DC/AC inverter. The bidirectional DC/AC inverter 30 includes a filter 34, a bridge circuit 39, a bridge circuit 45, a bridge circuit 51, a condenser 53, a coil 54, a plug 55, an outlet 56, and a relay 57. The filter 34 includes coils 31 and 32 and a condenser 33. The bridge circuit 39 includes four switching devices 35 through 38 and is connected to the filter 34. The bridge circuit 45 includes four switching devices 41 through 44 and is connected to the bridge circuit 39 through a condenser 40. The bridge circuit 51 includes four switching devices 47 through 50 and is connected the bridge circuit 45 through a transformer 46. The condenser 53 and the coil 54 are disposed between the bridge circuit 51 and a battery 52. The relay 57 electrically connects the bridge circuit 39 to the plug 55 through the filter 34 when the battery 52 is charged. The relay 57 connects the bridge circuit 39 to the outlet 56 through the filter 34 when the bidirectional DC/AC inverter 30 outputs alternating-current power. The switching devices 35 through 38, the switching devices 41 through 44 and the switching device 47 through 50 are, for example, insulated gate bipolar transistors (IGBTs), and a diode is connected in parallel to each switching device. The plug 55 is connected to the outlet 59 of an external power source 58 when the battery 52 is charged. The outlet 56 is connected to the plug 61 of an external load 60 when the bidirectional DC/AC inverter 30 outputs the alternating-current power.

The bidirectional DC/AC inverter 30 alternately turns on and off the switching devices 41 and 44 and the switching devices 42 and 43 of the bridge circuit 45 when the battery 52 is charged. More specifically, when the battery 52 is charged, alternating-current power inputted from the power source 58 into the bridge circuit 39 through the outlet 59, the plug 55, the relay 57 and the filter 34 is rectified by the diodes connected in parallel to the switching devices 35 through 38 of the bridge circuit 39 and smoothed by the condenser 40, thus being converted into direct-current power. And then, the direct-current power is converted into alternating-current power by the bridge circuit 45 and outputted to the bridge circuit 51 through the transformer 46. Sequentially, the alternating-current power is rectified by the diodes connected in parallel to the switching devices 47 through 50 of the bridge circuit 51 and smoothed by the condenser 53, thus being converted into direct-current power. Lastly, the direct-current power is supplied to the battery 52 through the coil 54.

In supplying alternating-current power to the load 60, the bidirectional DC/AC inverter 30 alternately turns on and off the switching devices 47 and 50 and the switching devices 48 and 49 of the bridge circuit 51 and alternately turns on and off the switching devices 35 and 38 and the switching devices 36 and 37 of the bridge circuit 39. More specifically, when the alternating-current power is supplied to the load 60, direct-current power obtained from the battery 52 is converted into alternating-current power by the bridge circuit 51 and outputted to the bridge circuit 45 through the transformer 46. And then, the alternating-current power is rectified by the diodes connected in parallel to the switching devices 41 through 44 of the bridge circuit 45 and smoothed by the condenser 40, thus being converted into direct-current power. Lastly, the direct-current power is converted into alternating-current power by the bridge circuit 39 and supplied to the load 60 through the filter 34, the relay 57, the outlet 56 and the plug 61.

The bidirectional DC/AC inverter 30 drives the bridge circuit 45 in charging the battery 52 and the bridge circuit 39 and the bridge circuit 51 in outputting alternating-current power (cf. Japanese Patent Application Publication No. 2001-37226).

However, current inputted to the inverter 30 when the battery 52 is charged or current to be outputted from the inverter 30 when the inverter 30 outputs the alternating-current power flows through the relay 57. Thus, the bidirectional DC/AC inverter 30 requires large-sized relay 57, with the result that the bidirectional DC/AC inverter 30 becomes large in size.

The present invention is directed to a bidirectional DC/AC inverter which prevents its size from becoming large.

SUMMARY OF THE INVENTION

According to the present invention, a bidirectional DC/AC inverter includes a power conversion means in connection with an electric storage means. The power conversion means is operable to convert alternating-current power inputted from a power source into direct-current power and output the direct-current power to the electric storage means when the electric storage means is charged. The power conversion means is operable to convert direct-current power obtained from the electric storage means into alternating-current power and outputting the alternating-current power to an external load when the inverter outputs the alternating-current power. The inverter includes a control means operable to control an operation of the power conversion means, a plug for electrically connecting the power source to the power conversion means, an outlet for electrically connecting the load to the power conversion means, an inhibiting member operable to cover at least the plug to inhibit the power conversion means from being electrically connected to the power source, and a detecting means operable to detect whether the plug is covered or not. The control means inhibits the power conversion means from outputting the alternating-current power when the detecting means detects that the plug is not covered by the inhibiting means.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1A:
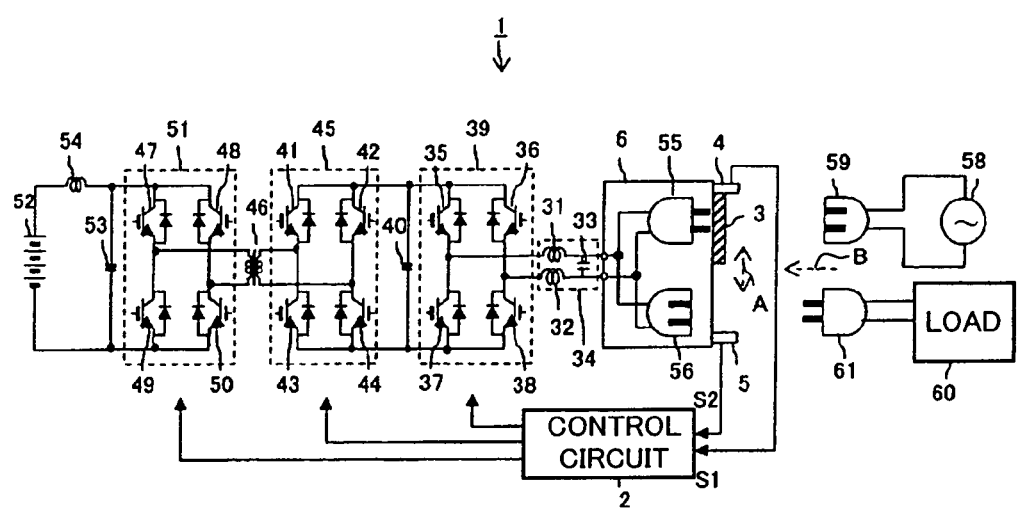
FIG. 1A is a circuit diagram of a bidirectional DC/AC inverter according to a preferred embodiment of the present invention.
Figure 1B:
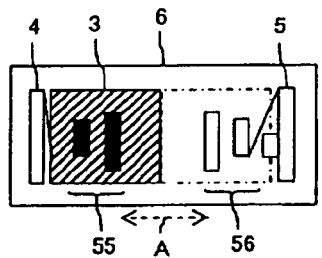
FIG. 1B is a schematic view of the casing of the bidirectional DC/AC inverter as seen in the direction of the arrow B in FIG. 1.
Figure 3:
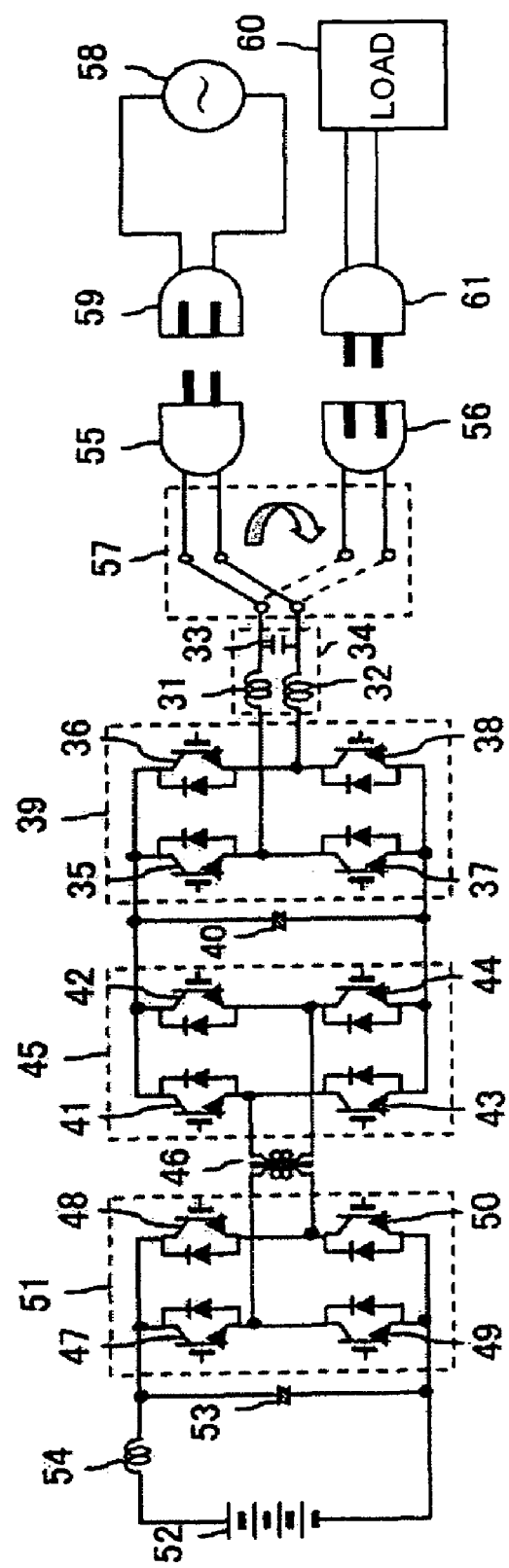
FIG. 3 is a circuit diagram of an existing bidirectional DC/AC inverter according to prior art.

The following will describe a preferred embodiment according to the present invention with reference to FIGS. 1A and 1B. FIG. 1A is a circuit diagram of the bidirectional DC/AC inverter of the preferred embodiment according to the present invention. It is noted that like or same elements are referred to by the same reference numerals as those in FIG. 3.

Referring to FIG. 1A, the bidirectional DC/AC inverter 1 includes a filter 34, a bridge circuit 39, a condenser 40, a bridge circuit 45, a transformer 46, a bridge circuit 51, a condenser 53, a coil 54, a plug 55, an outlet 56, a control circuit 2 (a control means), a movable shutter 3 (an inhibiting member), a microswitch 4 (a detecting means), and a microswitch 5 (the detecting means). The control circuit 2 drives the switching devices 41 through 44 of the bridge circuit 45 when a battery 52 as an electric storage means is charged and the switching device 35 through 38 of the bridge circuit 39 when the bidirectional DC/AC inverter 1 outputs alternating-current power. The movable shutter 3 is slidable in the direction of the arrow A in FIG. 1A for covering the plug 55 and the outlet 56. The microswitch 4 detects whether the plug 55 is covered by the movable shutter 3 or not. The microswitch 5 detects whether the outlet 56 is covered by the movable shutter 3 or not. The plug 55 and the outlet 56 are disposed in a casing 6. In addition to the plug 55 and the outlet 56, the other elements such as the filter 34 and the bridge circuit 39 may be disposed in the casing 6.

The power conversion means recited in the claims includes, for example, the filter 34, the bridge circuit 39, the condenser 40, the bridge circuit 45, the transformer 46, the bridge circuit 51, the condenser 53 and the coil 54. The switching devices 35 through 38 of the bridge circuit 39, the switching devices 41 through 44 of the bridge circuit 45 and the switching devices 47 through 50 of the bridge circuit 51 are IGBTs. Alternatively, the switching devices 35 through 38, the switching devices 41 through 44 and the switching devices 47 through 50 may be metal oxide semiconductor field-effect transistors (MOSFETs) having body diodes. The bridge circuit 39, the bridge circuit 45 and the bridge circuit 51 may be half-bridge circuits each having two switching devices.

FIG. 1B is a view of the casing 6 as seen in the direction of the arrow B in FIG. 1A. As shown in FIG. 1B, the movable shutter 3 is slid leftward by a user to cover the plug 55. This prevents the plug 55 from being connected to the outlet 59 and allows the outlet 56 to be connected to the plug 61. When the movable shutter 55 comes into contact with the microswitch 4, the microswitch 4 outputs a switching signal S1 to the control circuit 2. Upon receiving the switching signal S1, the control circuit 2 allows the drive of the bridge circuits 39 and 51 when the bidirectional DC/AC inverter 1 outputs alternating-current power to an external load. At this time, when the user connects the plug 61 to the outlet 56 and gives a command for outputting alternating-current power, the bidirectional DC/AC inverter 1 converts the direct-current power obtained from the battery 52 into alternating-current power and supplies it to the load 60.

The movable shutter 3 is slid rightward by the user to cover the outlet 56, thereby preventing the outlet 56 from being connected and the plug 61 and allowing the plug 55 to be connected to the outlet 59. When the movable shutter 3 comes into contact with the microswitch 5, the microswitch 5 outputs a switching signal S2 to the control circuit 2. Upon receiving the switching signal S2, the control circuit 2 may inhibit only the drive of the bridge circuits 39 and 51 so as not to output alternating-current power from the bidirectional DC/AC inverter 1 to the external load and allow the drive of the bridge circuit 45 when the battery 52 is charged. At this time, when the user connects the plug 55 to the outlet 59 and gives a command for charging the battery 52, the bidirectional DC/AC inverter 1 converts the alternating-current power outputted from the power source 58 into direct-current power and supplies it to the battery 52. Alternatively, upon receiving the switching signal S2, the control circuit 2 may inhibit only the drive of the bridge circuit 51 so as not to output alternating-current power from the bidirectional DC/AC inverter 1 to the external load and allow the drive of the bridge circuit 45 when the battery 52 is charged.

When the movable shutter 3 is slid by the user such that the movable shutter 3 is not in contact with any of the microswitches 4 and 5 and the switching signals S1 and S2 are not inputted to the control circuit 2, the control circuit 2 inhibits at least the drive of the bridge circuit 51 so as not to output alternating-current power form the bidirectional DC/AC inverter 1 to the external load. In this case, the control circuit 2 may allow the drive of the bridge circuit 45 when the battery 52 is charged.

As mentioned above, the bidirectional DC/AC inverter 1 switches between two operations, namely, an operation of charging the battery 52 and an operation of outputting alternating-current power, with the microswitches 4 and 5. Thus, even though the plug 55 and the outlet 56 are electrically and directly connected to each other without a relay and the like, the alternating-current power inputted from the power source 58 to the bidirectional DC/AC inverter 1 and the alternating-current power to be outputted from the bidirectional DC/AC inverter 1 to the external load are prevented from concurrently flowing in the bidirectional DC/AC inverter 1. Therefore, the bidirectional DC/AC inverter 1 dispenses with a large-sized relay for high current, with the result that the bidirectional DC/AC inverter 1 is prevented from becoming large in size.

The bidirectional DC/AC inverter 1 is configured to inhibit at least the drive of the bridge circuit 51 according to the switching signal S2 outputted from the microswitch 5 when the plug 55 is not covered by the movable shutter 3. Thus, the bidirectional DC/AC inverter 1 reliably prevents alternating-current power from being outputted therefrom when the plug 55 is not covered by the movable shutter 3.

In the above preferred embodiment, the microswitches 4 and 5 detect whether the plug 55 and the outlet 56 are covered by the movable shutter 3 or not. Alternatively, a photo sensor may be used for detecting whether the plug 55 and the outlet 56 are covered by the movable shutter 3 or not.

Figure 2A:
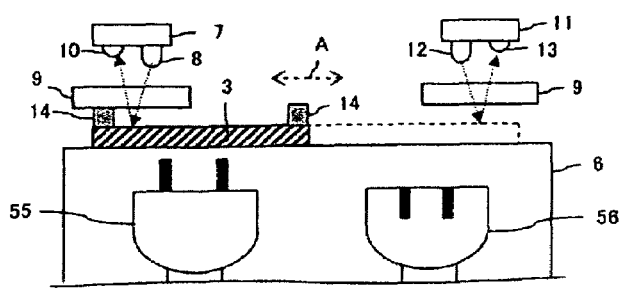
FIG. 2A is a schematic view of the bidirectional DC/AC inverter around a movable shutter according to an alternative embodiment of the present invention.

FIG. 2A is a view showing an alternative embodiment in which photo sensors 7 and 11 are used for detecting whether the plug 55 and the outlet 56 are covered by the movable shutter 3 or not. It is noted that like or same elements are referred to by the same reference numerals as those in FIG. 1B.

Referring to FIG. 2A, the movable shutter 3 is slid leftward by the user to cover the plug 55. At this time, the light emitted from the light-emitting portion 8 of the photo sensor 7 passes through a resin window 9 made of transparent resin and is reflected at the movable shutter 3. This reflected light passes through the resin window 9 again and reaches the light-receiving portion 10 of the photo sensor 7 to output the switching signal S1 from the photo sensor 7 to the control circuit 2. Upon receiving the switching signal S1, the control circuit 2 allows the drive of the bridge circuits 39 and 51 when the bidirectional DC/AC inverter 1 outputs alternating-current power to the external load. It is noted that when the movable shutter 3 is slid rightward by the user so that the light emitted from the light-emitting portion 8 is not reflected at the movable shutter 3 and does not reach the light-receiving portion 10, the photo sensor 7 may be configured to output the switching signal S2 to the control circuit 2 for inhibiting the drive of the bridge circuits 39 and 51 so as not to output alternating-current power from the bidirectional DC/AC inverter 1 to the external load.

When the movable shutter 3 is slid rightward by the user to cover the outlet 56, the light emitted from the light-emitting portion 12 of the photo sensor 11 (the detecting means) passes through another resin window 9 and is reflected at the movable shutter 3. This reflected light passes through the resin window 9 again and reaches the light-receiving portion 13 of the photo sensor 11 to output the switching signal S2 from the photo sensor 11 to the control circuit 2. Upon receiving the switching signal S2, the control circuit 2 inhibits the drive of the bridge circuits 39 and 51 so as not to output alternating-current power from the bidirectional DC/AC inverter 1 to the external load and allows the drive of the bridge circuit 45 when the battery 52 is charged.

The photo sensor 7 may be configured to output the switching signal S1 when infrared rays emitted from the light-emitting portion 8 are reflected at the movable shutter 3 and reach the light-receiving portion 10. Similarly, the photo sensor 11 may be configured to output the switching signal S2 when infrared rays emitted from the light-emitting portion 12 are reflected at the movable shutter 3 and reach the light-receiving portion 13. In this case, the resin windows 9 are made of resin through which the infrared rays can pass.

Still referring to FIG. 2A, a brush 14 is provided at each end of the movable shutter 3 for cleaning the resin windows 9. Every time the movable shutter 3 is slid, the surface of the resin windows 9 are cleaned by the brushes 14. Thus, the photo sensors 7 and 11 are prevented from wrongly operating due to dirt or dust on the surface of the resin windows 9.

As mentioned above, the bidirectional DC/AC inverter 1, which has the photo sensors 7 and 11 without a relay and the like, prevents the alternating-current power inputted from the power source 58 to the bidirectional DC/AC inverter 1 and the alternating-current power to be outputted from the bidirectional DC/AC inverter 1 to the external load from concurrently flowing therein. Thus, the bidirectional DC/AC inverter 1 dispenses with a large-sized relay for high current, with the result that the bidirectional DC/AC inverter 1 is prevented from becoming large in size.

When the photo sensors 7 and 11 are used in the bidirectional DC/AC inverter 1, the photo sensors 7 and 11 are out of contact with the movable shutter 3 and hence failure of the photo sensors 7 and 11 due to abrasion does not occur. Thus, the lifetime of the photo sensors 7 and 11 is longer than that of the microswitches 4 and 5.

In the above embodiment, the movable shutter 3 is operable to cover the plug 55 and the outlet 56. Alternatively, the movable shutter 3 may be operable to cover only the plug 55.

Figure 2B:
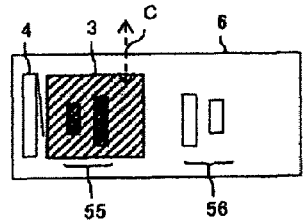
FIG. 2B is a schematic view of the bidirectional DC/AC inverter around the movable shutter according to an alternative embodiment of the present invention.
Figure 2C:
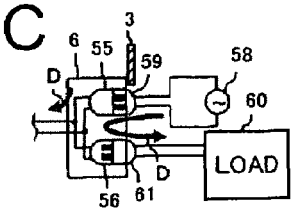
FIG. 2C is a circuit diagram of the bidirectional DC/AC inverter around the movable shutter according to the alternative embodiment of the present invention when the plug and the outlet of the inverter are connected to a power source and an external load, respectively.

FIG. 2B is a view of an alternative embodiment in which the movable shutter 3 is operable to cover only the plug 55. It is noted that like or same elements are referred to by the same reference numerals as those in FIG. 1B. The movable shutter 3 is slidable in the direction of the arrow C. FIG. 2C shows a flow of current outputted from the power source 58 when the plug 55 and the outlet 59 are connected and the outlet 56 and the plug 61 are connected in a state where the plug 55 is not covered by the movable shutter 3. It is noted that like or same elements are referred to by the same reference numerals as those in FIG. 1A.

Referring to FIG. 2B, the movable shutter 3 is slid downward by the user to cover the plug 55, thereby preventing the connection of the plug 55 and the outlet 59. When the movable shutter 3 comes into contact with the microswitch 4, the microswitch 4 outputs the switching signal S1 to the control circuit 2. Upon receiving the switching signal S2, the control circuit 2 allows the drive of the bridge circuits 39 and 51 when the bidirectional DC/AC inverter 1 outputs alternating-current power to the external load.

When the movable shutter 3 is slid upward by the user to uncover the plug 55, the movable shutter 3 comes out of contact with the microswitch 4 which in turn outputs the switching signal S2 to the control circuit 2. Upon receiving the switching signal S2, the control circuit 2 inhibits the drive of the bridge circuits 39 and 51 so as not to output alternating-current power from the bidirectional DC/AC inverter 1 to the external load and allows the drive of the bridge circuit 45 when the battery 52 is charged.

In the structure in which the movable shutter 3 is operable to cover only the plug 55, when the movable shutter 3 does not cover the plug 55, the plug 55 and the outlet 59 are connectable to each other and the outlet 56 and plug 61 are connectable to each other as shown in FIG. 2C. In this case, the current outputted from the power source 58 flows in both the bidirectional DC/AC inverter 1 and the load 60 as shown by the arrows D in FIG. 2C. Thus, the bidirectional DC/AC inverter 1 outputs alternating-current power to the load 60 while charging the battery 52.

Figure 2D:
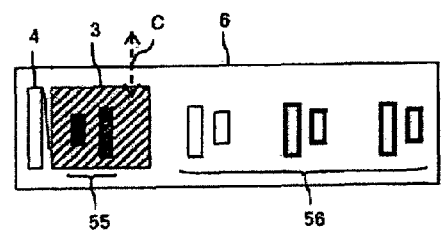
FIG. 2D is a schematic view of the bidirectional DC/AC inverter around the movable shutter according to an alternative embodiment of the present invention.

In the above preferred embodiment, only the one outlet 56 is provided in the casing 6. In an alternative embodiment, a plurality of the outlets 56 may be provided in the casing 6. In FIG. 2D, three outlets 56 are provided in the casing 6.

Figure 2E:
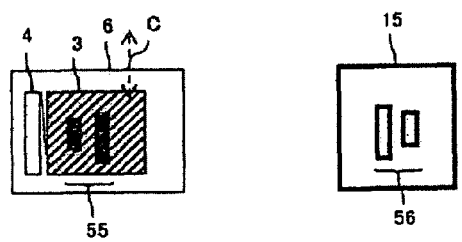
FIG. 2E is a schematic view of the bidirectional DC/AC inverter around a plug and an outlet according to an alternative embodiment of the present invention.

In the above preferred embodiment, the plug 55 and the outlet 56 are provided in the casing 6. In an alternative embodiment, the plug 55 and the outlet 56 may be provided in different casings. In FIG. 2E, the plug 55 is provided in the casing 6 and the outlet 56 in a casing 15.

Figure 2F:
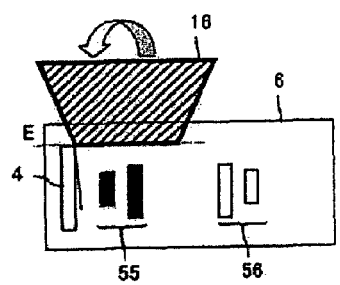
FIG. 2F is a schematic view of the bidirectional DC/AC inverter around a pivotal cover according to an alternative embodiment of the present invention.

Except the slide-type movable shutter 3, an inhibiting member for inhibiting the connection of the plug 55 and the outlet 59 and the connection of the outlet 56 and the plug 61 is, for example, a cover 16 as shown in FIG. 2F, which is pivotable on an axis E to open and close. The inhibiting member is not limited as long as it is operable to cover the plug 55 and configured to cause the microswitch 4 (or the microswitch 5) or the photo sensor 7 (or the photo sensor 11) to output the switching signal S2 therefrom.

In the above preferred embodiment, the battery 52 is used as the electric storage means. Alternatively, the electric storage means is not limited to the battery 52 and may be a condenser or the like as long as it is chargeable.

Therefore, the present examples and embodiments are to be considered as illustrative and not restrictive, and the invention is not to be limited to the details given herein but may be modified within the scope of the appended claims.

What is claimed is:

1. A bidirectional DC/AC inverter comprising:
   a power conversion means in connection with an electric storage means, the power conversion means being operable to convert alternating-current power inputted from a power source into direct-current power and output the direct-current power to the electric storage means when the electric storage means is charged, the power conversion means being operable to convert direct-current power obtained from the electric storage means into alternating-current power and outputting the alternating-current power to an external load when the inverter outputs the alternating-current power;
   a control means operable to control an operation of the power conversion means;
   a plug for electrically connecting the power source to the power conversion means;
   an outlet for electrically connecting the load to the power conversion means;
   an inhibiting member operable to cover at least the plug to inhibit the power conversion means from being electrically connected to the power source; and
   a detecting means operable to detect whether the plug is covered or not, the control means inhibiting the power conversion means from outputting the alternating-current power when the detecting means detects that the plug is not covered by the inhibiting means.

2. The bidirectional DC/AC inverter according to claim 1, wherein the inhibiting member covers the outlet when the inhibiting member does not cover the plug.

3. The bidirectional DC/AC inverter according to claim 1, wherein the detecting means includes a microswitch which outputs a switching signal to the control means when detecting that the plug is not covered by the inhibiting means, the control means inhibiting the power conversion means from outputting the alternating-current power upon receiving the switching signal.

4. The bidirectional DC/AC inverter according to claim 3, wherein the microswitch is located adjacent to the plug.

5. The bidirectional DC/AC inverter according to claim 4, wherein the detecting means further includes another microswitch adjacent to the outlet.

6. The bidirectional DC/AC inverter according to claim 3, wherein the microswitch is located adjacent to the outlet.

7. The bidirectional DC/AC inverter according to claim 1, wherein the detecting means includes a photo sensor which outputs a switching signal when detecting that the plug is not covered by the inhibiting means, the control means inhibiting the power conversion means from outputting the alternating-current power upon receiving the switching signal.

8. The bidirectional DC/AC inverter according to claim 7, wherein the photo sensor is directed substantially toward the outlet.

9. The bidirectional DC/AC inverter according to claim 8, wherein the detecting means further includes another photo sensor directed substantially toward the plug.

10. The bidirectional DC/AC inverter according to claim 1, wherein the inverter includes at least one of the outlets.

11. The bidirectional DC/AC inverter according to claim 1, wherein the plug and the outlet are provided in a casing.

12. The bidirectional DC/AC inverter according to claim 1, wherein the plug and the outlet are provided in different casings.

13. The bidirectional DC/AC inverter according to claim 1, wherein the inhibiting member is a slidable shutter.

14. The bidirectional DC/AC inverter according to claim 13, wherein a brush is provided at each end of the slidable shutter.

15. The bidirectional DC/AC inverter according to claim 1, wherein the inhibiting member is a pivotable cover.

16. The bidirectional DC/AC inverter according to claim 1, wherein the control means allows the power conversion means to output the direct-current power when the detecting means detects that the plug is not covered by the inhibiting means.

17. The bidirectional DC/AC inverter according to claim 1, wherein the plug and the outlet are electrically and directly connected to each other.

18. The bidirectional DC/AC inverter according to claim 1, wherein the electric storage means is a battery.

* * * * *